UNITED STATES PATENT OFFICE.

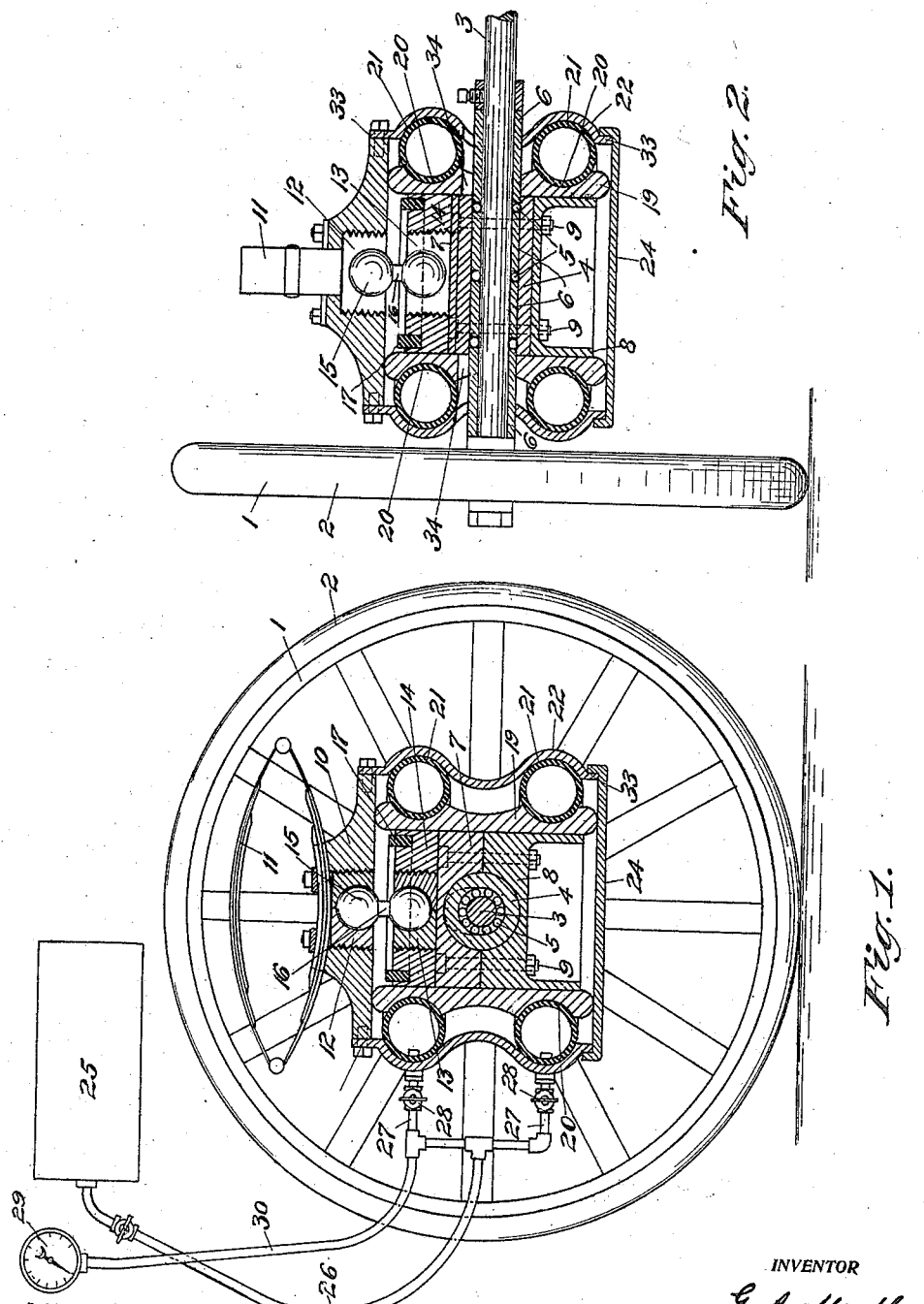

GORDON A. MURPHY, OF OAKLAND, CALIFORNIA, ASSIGNOR OF ONE-HALF TO EDWARD HEBERN, OF OAKLAND, CALIFORNIA.

PNEUMATIC SUSPENSION FOR VEHICLES.

984,233. Specification of Letters Patent. Patented Feb. 14, 1911.

Application filed February 16, 1910. Serial No. 544,213.

*To all whom it may concern:*

Be it known that I, GORDON A. MURPHY, a citizen of the United States, residing at Oakland, in the county of Alameda and State of California, have invented new and useful Improvements in Pneumatic Suspension for Vehicles, of which the following is a specification.

The object of my present invention is to provide means for supporting the weight of a vehicle upon the wheels so as to take up and absorb the shock caused by the wheel coming in contact with an obstacle over which it passes.

In the accompanying drawing, Figure 1 is a section of the device transverse to the axle; Fig. 2 is a longitudinal section, the wheel being shown in side view.

Referring to the drawing, 1 indicates the wheel which has a solid rubber tire 2 thereon, and is secured to the axle 3, the drawing showing the rear wheel of an automobile. The same construction will apply however, for front axle except that the wheel is not attached thereto. Said axle is contained within a bushing 4 and runs therein on ball bearings 5 spaced by collars 6 secured upon the axle. Said bushing 4 is supported within upper and lower boxes 7, 8, which are secured together by bolts 9. The object in providing an inner bushing is to enable the device to be adapted to any size of axle by merely changing the bushing to the size necessary to fit the axle.

10 indicates a bearing which supports the elliptic springs 11 which sustain the weight of the body of the vehicle.

It is supposed that the mechanism for propelling the vehicle is made fast to a separate frame, resting upon the axles of the vehicle, and secured in such a manner as to hold said axles rigid and unmovable in respect to each other, both to the front and to the rear. It is intended to have the weight carried directly on the axles entirely separate and independent of the weight of the body of the vehicle, which is carried on the bearing 10.

12 and 13 indicate socket pieces, the former of which is screwed into the bearing 10 while the latter is screwed into an annular block 14 resting upon the box 7. In sockets in said plates are contained the upper and lower spherical ends of a support 15 which has its spherical ends connected by a short cylindrical neck 16. This spherical-ended support permits the bearing to move freely with reference to the box until it is stopped by a rubber cushion 17. It will be understood that the socket pieces are made in halves in order to secure them around the spherical ends of the support.

Surrounding the boxes and bearing, is a cylinder 19 which can slide freely with reference thereto, having slots 34 to pass around the shaft. Its outer surface is formed with horizontal circular grooves 20. Surrounding said cylinder and fitting in said grooves are annular tubes 21 of rubber, resembling the ordinary pneumatic tire. Surrounding the tubes is a casing 22 having internal grooves within which the tubes 21 fit, and flanges 33, the upper flange being secured to the bearing 10, while the lower flange is secured to a casing 24, which incloses the device at the lower end and prevents the access of dust.

The air for filling the pneumatic tubes is compressed by the motive power of the vehicle and stored in a tank 25 carried on said vehicle and is supplied by a flexible pipe 26 having branches 27 entering the tubes and controlled by valves 28.

29 indicates a pressure gage which is connected with one of the branches 27 by a flexible pipe 30. By providing a valve for each of the pneumatic tubes, the air can be confined in either of them in case of puncture of the other.

The operation of the device is as follows: In case the wheel encounters any obstacle which causes a shock and momentary retardation of the axle, while the vehicle body continues its movement by its momentum, the support 15 swings downward, compressing the pneumatic tubes, which thus absorb the shock. Upon passing over the obstacle the pressure of the air in the pneumatic tubes restores the parts to their normal position.

I claim:—

1. In a vehicle, the combination of an axle, a bearing for supporting the weight of the vehicle, a support on said axle, double ball and socket connection between said bearing and support allowing the bearing to move horizontally, and a pneumatic tube surrounding said support and adapted to be compressed when the bearing moves horizontally in any direction, substantially as described.

2. In a vehicle, the combination of an axle, a bearing for supporting the weight of the vehicle, a support on said axle, double ball and socket connection between said bearing and support allowing the bearing to move horizontally, and upper and lower pneumatic tubes surrounding said support and adapted to be compressed when the bearing moves horizontally in any direction, substantially as described.

3. In a vehicle, the combination of an axle, boxes therefor, a bearing for supporting the weight of the vehicle, socket pieces one of which is connected to said bearing and the other is supported by said boxes, a spherical-ended support for said bearing, a cylinder around said boxes, pneumatic tubes on said cylinder, and a casing around said tubes, and connected to said bearing, substantially as described.

In testimony whereof I have hereunto set my hand in the presence of two subscribing witnesses.

GORDON A. MURPHY.

Witnesses:
    EDWARD HEBERN,
    L. C. LEET.